United States Patent
Tchilian et al.

(10) Patent No.: US 11,851,217 B1
(45) Date of Patent: Dec. 26, 2023

(54) STAR TRACKER USING VECTOR-BASED DEEP LEARNING FOR ENHANCED PERFORMANCE

(71) Applicant: Ball Aerospace & Technologies Corp., Boulder, CO (US)

(72) Inventors: Emil Tchilian, Longmont, CO (US); Zachary Schmidt, Boulder, CO (US); Bevan D. Staple, Longmont, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 576 days.

(21) Appl. No.: 16/745,725

(22) Filed: Jan. 17, 2020

Related U.S. Application Data

(60) Provisional application No. 62/795,707, filed on Jan. 23, 2019.

(51) Int. Cl.
*B64G 1/00* (2006.01)
*B64G 1/36* (2006.01)
(Continued)

(52) U.S. Cl.
CPC ............ *B64G 1/361* (2013.01); *G01S 3/7867* (2013.01); *G06F 18/214* (2023.01); *G06N 3/04* (2013.01);
(Continued)

(58) Field of Classification Search
CPC ......... B64G 1/361; G06T 7/246; G06T 5/002; G06T 2207/20081; G06T 2207/20084;
(Continued)

(56) References Cited

U.S. PATENT DOCUMENTS

| 5,588,073 A | 12/1996 | Lee et al. |
| 5,719,794 A | 2/1998 | Altshuler et al. |

(Continued)

FOREIGN PATENT DOCUMENTS

| CN | 108875595 | 11/2018 | |
| CN | 108985372 A | * 12/2018 | ............. G06K 9/342 |

OTHER PUBLICATIONS

U.S. Appl. No. 16/597,411, filed Oct. 9, 2019, Schmidt et al.
(Continued)

*Primary Examiner* — Pakee Fang
(74) *Attorney, Agent, or Firm* — Sheridan Ross P.C.

(57) ABSTRACT

Star tracker systems and methods are provided. The star tracker incorporates deep learning processes in combination with relatively low cost hardware components to provide moderate (e.g. ~1 arc second attitude uncertainty) accuracy. The neural network implementing the deep learning processes can include a Hinton's capsule network or a coordinate convolution layer to maintain spatial relationships between features in images encompassing a plurality of features. The hardware components can be configured to collect a blurred or defocused image in which point sources of light appear as blurs, and in which the blurs create points of intersection. Alternatively or in addition, a blurred or defocused image can be created using processes implemented as part of application programming. The processing of collected images by a neural network to provide an attitude determination can include analyzing a plurality of blurs and blur intersections across an entire frame of image data.

11 Claims, 7 Drawing Sheets

(51) Int. Cl.
| | |
|---|---|
| *G01S 3/786* | (2006.01) |
| *G06T 5/00* | (2006.01) |
| *G06T 7/246* | (2017.01) |
| *G06N 3/08* | (2023.01) |
| *G06N 3/04* | (2023.01) |
| *G06V 10/40* | (2022.01) |
| *G06F 18/214* | (2023.01) |
| *H04N 23/54* | (2023.01) |
| *H04N 23/55* | (2023.01) |

(52) U.S. Cl.
CPC ............... *G06N 3/08* (2013.01); *G06T 5/002* (2013.01); *G06T 7/246* (2017.01); *G06V 10/40* (2022.01); *H04N 23/54* (2023.01); *H04N 23/55* (2023.01); *G06T 2207/20081* (2013.01); *G06T 2207/20084* (2013.01)

(58) Field of Classification Search
CPC .... G06V 10/40; G01S 3/7867; G06K 9/6256; G06N 3/04; G06N 3/08; H04N 5/2253; H04N 5/2254
See application file for complete search history.

(56) References Cited

U.S. PATENT DOCUMENTS

| | | | |
|---|---|---|---|
| 5,960,391 A | 9/1999 | Tateishi et al. | |
| 6,075,991 A | 6/2000 | Raleigh et al. | |
| 6,252,627 B1 | 6/2001 | Frame et al. | |
| 6,437,692 B1 | 8/2002 | Petite et al. | |
| 6,597,394 B1 | 7/2003 | Duncan et al. | |
| 6,820,053 B1 | 11/2004 | Ruwisch | |
| 7,020,501 B1 | 3/2006 | Elliott et al. | |
| 7,590,098 B2 | 9/2009 | Ganesh | |
| 8,019,544 B2 | 9/2011 | Needelman et al. | |
| 8,583,371 B1 | 11/2013 | Goodzeit et al. | |
| 8,929,936 B2 | 1/2015 | Mody et al. | |
| 9,073,648 B2 | 7/2015 | Tsao et al. | |
| 9,191,587 B2 | 11/2015 | Wright et al. | |
| 9,294,365 B2 | 3/2016 | Misra et al. | |
| 9,449,374 B2 | 9/2016 | Nash et al. | |
| 9,702,702 B1 * | 7/2017 | Lane ......................... | G06T 5/50 |
| 9,924,522 B2 | 3/2018 | Gulati et al. | |
| 9,927,510 B2 | 3/2018 | Waldron et al. | |
| 10,021,313 B1 | 7/2018 | Chen et al. | |
| 10,027,893 B2 | 7/2018 | Bell et al. | |
| 10,048,084 B2 | 8/2018 | Laine et al. | |
| 10,271,179 B1 | 4/2019 | Shima | |
| 10,970,520 B1 * | 4/2021 | Kim ........................ | G06T 3/60 |
| 2004/0190762 A1 * | 9/2004 | Dowski, Jr. ......... | G02B 27/0025 |
| | | | 382/128 |
| 2005/0049876 A1 | 3/2005 | Agranat | |
| 2005/0213096 A1 | 9/2005 | Kouris et al. | |
| 2005/0228660 A1 | 10/2005 | Schweng | |
| 2006/0030332 A1 | 2/2006 | Carrott et al. | |
| 2006/0238623 A1 | 10/2006 | Ogawa | |
| 2007/0010956 A1 | 1/2007 | Nerguizian et al. | |
| 2008/0020354 A1 | 1/2008 | Goree et al. | |
| 2008/0045235 A1 | 2/2008 | Kennedy et al. | |
| 2008/0293353 A1 | 11/2008 | Mody et al. | |
| 2009/0179142 A1 | 7/2009 | Duparre et al. | |
| 2009/0197550 A1 | 8/2009 | Huttunen et al. | |
| 2009/0268619 A1 | 10/2009 | Dain et al. | |
| 2010/0091017 A1 | 4/2010 | Kmiecik et al. | |
| 2012/0071105 A1 | 3/2012 | Walker et al. | |
| 2012/0072986 A1 | 3/2012 | Livsics et al. | |
| 2012/0163355 A1 | 6/2012 | Heo et al. | |
| 2012/0167144 A1 | 6/2012 | Avison-Fell | |
| 2012/0202510 A1 | 8/2012 | Singh | |
| 2012/0238201 A1 | 9/2012 | Du et al. | |
| 2012/0238220 A1 | 9/2012 | Du et al. | |
| 2014/0218520 A1 | 8/2014 | Teich et al. | |
| 2014/0232871 A1 | 8/2014 | Kriel et al. | |
| 2014/0282783 A1 | 9/2014 | Totten et al. | |
| 2014/0329540 A1 | 11/2014 | Duggan et al. | |
| 2015/0009072 A1 | 1/2015 | Nijsure | |
| 2015/0358546 A1 | 12/2015 | Higashiyama | |
| 2016/0101779 A1 | 4/2016 | Katoh | |
| 2016/0173241 A1 | 6/2016 | Goodson et al. | |
| 2016/0187477 A1 | 6/2016 | Wang | |
| 2016/0198141 A1 * | 7/2016 | Fettig .................... | H04N 13/218 |
| | | | 348/46 |
| 2016/0227138 A1 | 8/2016 | Kozlowski | |
| 2016/0379374 A1 | 12/2016 | Sokella et al. | |
| 2017/0120906 A1 | 5/2017 | Penilla et al. | |
| 2017/0123429 A1 | 5/2017 | Levinson et al. | |
| 2017/0131096 A1 | 5/2017 | Karlov et al. | |
| 2017/0366264 A1 | 12/2017 | Riesing et al. | |
| 2018/0019910 A1 | 1/2018 | Tsagkaris et al. | |
| 2018/0025641 A1 | 1/2018 | LaVelle et al. | |
| 2018/0033449 A1 | 2/2018 | Theverapperuma et al. | |
| 2018/0053108 A1 * | 2/2018 | Olabiyi .................. | G06N 7/005 |
| 2018/0082438 A1 | 3/2018 | Simon et al. | |
| 2018/0107215 A1 | 4/2018 | Djuric et al. | |
| 2018/0121767 A1 * | 5/2018 | Wang .................... | G06N 3/0454 |
| 2018/0149730 A1 | 5/2018 | Li et al. | |
| 2018/0268571 A1 | 9/2018 | Park et al. | |
| 2018/0293893 A1 | 10/2018 | Yang et al. | |
| 2018/0324595 A1 | 11/2018 | Shima | |
| 2019/0049955 A1 | 2/2019 | Yabuuchi et al. | |
| 2019/0066713 A1 | 2/2019 | Mesgarani et al. | |
| 2019/0122689 A1 | 4/2019 | Jain et al. | |
| 2019/0164430 A1 | 5/2019 | Nix | |
| 2019/0213887 A1 | 7/2019 | Kitayama et al. | |
| 2019/0222752 A1 | 7/2019 | Burstein | |
| 2019/0294108 A1 | 9/2019 | Ozcan et al. | |
| 2019/0318725 A1 | 10/2019 | Le Roux et al. | |
| 2019/0322282 A1 | 10/2019 | Theodosis et al. | |
| 2019/0353741 A1 | 11/2019 | Bolster, Jr. et al. | |
| 2019/0363430 A1 | 11/2019 | Wang et al. | |
| 2020/0333140 A1 | 10/2020 | Elson et al. | |

OTHER PUBLICATIONS

U.S. Appl. No. 16/668,826, filed Oct. 30, 2019, Shima.
U.S. Appl. No. 16/693,992, filed Nov. 25, 2019, Tchilian.
U.S. Appl. No. 16/806,367, filed Mar. 2, 2020, Frye et al.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.

* cited by examiner

STAR TRACKER USING VECTOR-BASED DEEP LEARNING FOR ENHANCED PERFORMANCE

CROSS-REFERENCE TO RELATED APPLICATIONS

This application claims the benefit of U.S. Provisional Patent Application Ser. No. 62/795,707, filed Jan. 23, 2019, the entire disclosure of which is hereby incorporated herein by reference.

FIELD

Star tracker devices and methods utilizing relatively low cost components and vector-based deep learning are provided.

BACKGROUND

Star trackers continue to play a key role in spacecraft guidance and control systems. A star tracker is fundamentally a camera that images a star field and computes and reports the direction the star tracker boresight is pointing (its attitude). Like all components used in space missions, there is continuous pressure to reduce size, weight, power and cost (SWAP-C) and increase the lifetime of these components without compromising performance. A tracker must be rugged enough to survive the stresses of launch and then function for many years in the extreme temperatures and radiation encountered in the harsh environment of space. Star trackers are typically mounted on the external surface of a spacecraft bus and are not shielded from the environment.

First generation star trackers utilized imaging tube technologies and analog electronics. Charge-coupled-devices (CCDs) brought much greater optical sensitivity, and the digital electronics which supplanted the analog circuitry in second-generation trackers enabled more sophisticated algorithms, greatly increasing their performance. CCD sensors, however, require special electronics for control and clocking the image sensor, and an external analog to digital converter (ADC) to digitize the CCD output signal. Further, a CCD's performance degrades when subjected to the space proton environment and they are susceptible to transient effects from high energy particles encountered in space.

The advent of CMOS imaging sensors brought the promise of increased radiation hardness of the imager through the use of silicon-on-insulator (SOI) structures to reduce the volume of active silicon in the imaging sensor. CMOS sensors also integrate the clocking and ADC circuitry on the same die, reducing the number of electronic components required and therefore reducing the SWAP of the trackers. However, trackers using earlier CMOS imagers suffered in performance since the sensors were front-side illuminated (FSI), which significantly reduced their sensitivity. The use of micro-lenses partly counteracts the lower sensitivity of FSI CMOS imagers, but reduce the accuracy of the computed stellar image centroids. Also, the first CMOS star tracker sensors used less sophisticated pixel designs and relied on a simple rolling-shutter readout scheme that resulted in a skewed readout time of the imaged stars across the array.

More recently, CMOS sensor vendors are producing sophisticated back-side illuminated (BSI) CMOS imaging sensors, which feature fundamentally improved sensitivity. BSI sensor designs result in the entire surface of the imaging sensor being light sensitive, greatly improving the sensor's quantum efficiency and fill-factor while eliminating the need for micro-lenses. Newer sensors use more sophisticated CMOS pixel designs featuring higher transistor count, pinned photodiodes and transfer gates to provide 'snapshot' or global shutter readout. In this mode, all pixels in the array integrate signal for the same absolute time period. A modern star tracker can also benefit from continuing advances in electronics integration. However, due to processing limitations and to practical limitations in providing highly precise optics in connection with a large image sensor, CMOS sensor based star trackers have typically been limited to using a limited number of stars imaged onto an area consisting of only a portion of the total number of pixels of the sensor for attitude determination.

In a typical implementation of a star tracker incorporating a digital image sensor, the sensor includes an array of pixels that is used to obtain an image from within a field of view of the device defined by the size of the sensor and associated imaging optics. The relative location of identified stars within the image, and the line of sight of the device, enable a relative location of a platform carrying the star tracker device to be determined. However, determining the relative location of stars with even moderate accuracy (i.e. having an attitude uncertainty of ~1 arc-second) has required expensive, low noise detectors and specialized optical components that are capable of imaging light from stars as precisely focused point sources. Because of the high cost of such components, star trackers have typically been limited to use in systems having large budgets. Accordingly, it would be desirable to provide a star tracker having acceptable accuracy and precision using lower cost components. For example, it would be desirable to provide a star tracker having moderate accuracy that was capable of using commercial, off the shelf components.

SUMMARY

Embodiments of the present disclosure provide systems and methods that use vector-based deep learning to improve the performance of a star tracker built using commercial off-the-shelf (COTS) components, including a relatively low cost CMOS detector and catalog optics. In addition to decreasing the cost of required components, this approach enables a large reduction in manufacturing, test, and material costs. In accordance with embodiments of the present disclosure, a neural network, such as a network incorporating Hinton's capsule networks (HCNs) or featuring a coordinate convolution layer, is used to simultaneously classify and localize features within a full frame image of a scene containing hundreds of stars. In accordance with further embodiments of the present disclosure, a neural network is used to classify and localize features that emerge from a defocused scene of stars. The locations of these features in the image are correlated to a particular orientation of the camera or optical system used to collect the image, and are in turn applied to an attitude determination. Because of the additional features in a collected image created by the inclusion of a large number of stars, alone or in combination with the blurring of each light source due to the de-focusing, the star tracker can generate an adequate solution in the presence of noise and distortion created by the associated optics. In particular, each feature loses precision, but more features exist in the scene as imaged that can be utilized in determining the attitude solution, compensating for the flaws that come with the lower quality optics and electronics that can be utilized in embodiments of the present disclosure. More particularly, embodiments of the present disclosure provide a method of using vector-based deep learning to improve the performance of a star tracker built with COTS, low cost CMOS detector and catalog optics. This results in a large reduction in manufacturing, test, and material costs.

Star tracker systems or devices in accordance with embodiments of the present disclosure can include an optical system that collects light from within a field of view encompassing at least a portion of a scene containing a plurality of stars. The light collected by the optical system is directed to a detector. In accordance with embodiments of the present disclosure, the detector includes an array of pixels defining a focal imaging plane. The optical system and detector can be arranged such that the image information is blurred or defocused as it is received at the focal plane of the detector. The blurring or defocusing can be achieved through physically shifting the components of the optical train such that the collected image data is blurred or defocused. Alternatively or in addition, the diffusion elements or the like can be included in the optical system. The star tracker additionally includes a processor and memory. Application programming stored in the memory can be executed by the processor two determine an attitude of the star tracker from collected image information. More particularly, the application programming can implement a vector based deep learning model incorporating a Hinton's capsule network or a coordinate convolution layer. The deep learning model or network is generally trained to determine the attitude of the star tracker from collected image information. In accordance with the least some embodiments of the present disclosure, the image information processed by the deep learning network includes intentionally defocused or blurred information. Moreover, the application programming can implement a defocusing module. Embodiments of the present disclosure incorporate relatively low cost, commercial off-the-shelf optical system and detector components.

Methods in accordance with embodiments of the present disclosure include training a vector based deep learning network to determine pose or attitude information based on image data. The image data used to determine the attitude information includes image information collected from a scene containing a plurality of stars. In addition, the image information can include a variety of features, including blur centroids and intersections between blurs within the image data. At least some embodiments of the present disclosure include the intentional creation of a blurred or defocused image for use in attitude determination. The creation of a blurred or defocused image can be achieved through the physical manipulation or configuration of optical components within a star tracker, and/or processing the collected image data in a blurring module or kernel included in application programming. Execution of the application programming to analyze collected image data and to output an attitude determination can be performed using a graphical processing unit or other processor included in the star tracker. In addition, methods in accordance with embodiments of the present disclosure enable image data to be collected using relatively low cost optical system and detector components.

Additional features and advantages of embodiments of the present disclosure will become more readily apparent from the following discussion, particularly when taken together with the accompanying drawings.

DETAILED DESCRIPTION

Figure 1:
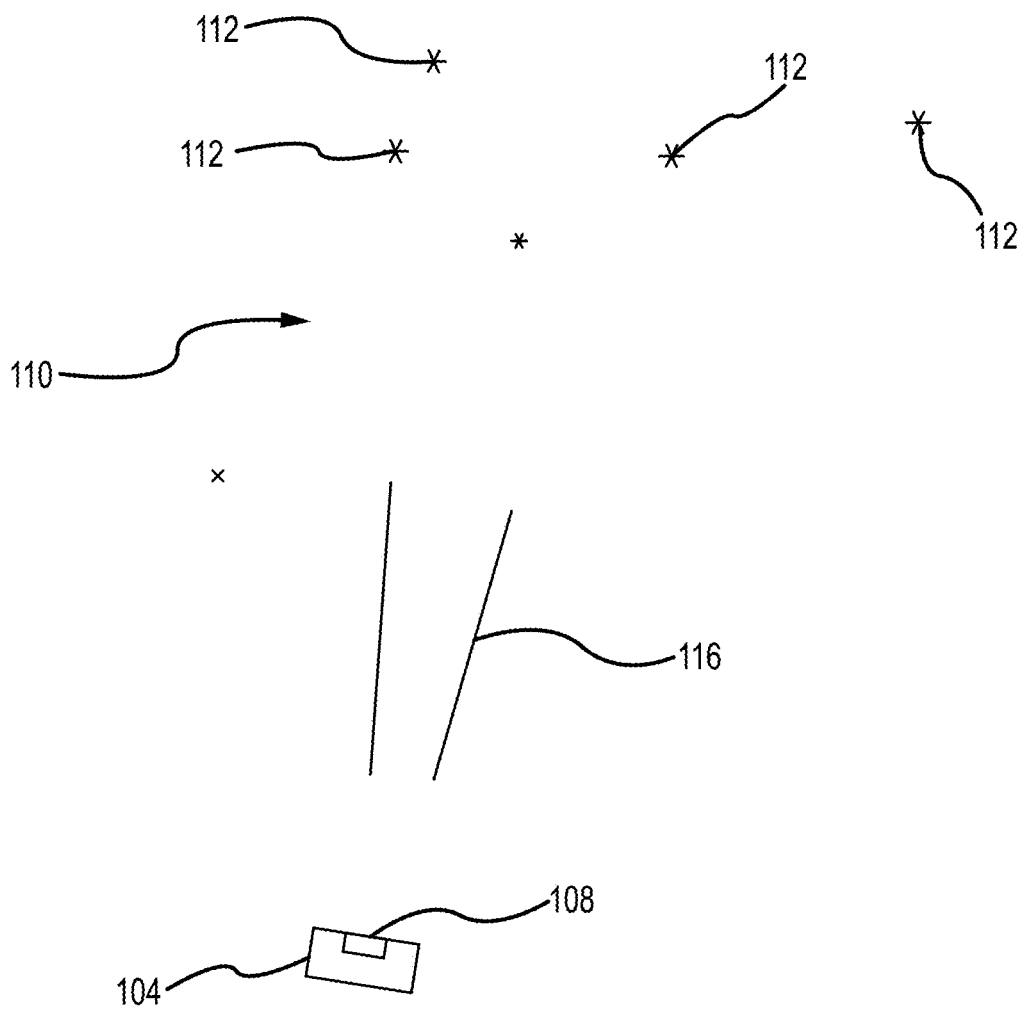
FIG. 1 depicts an example scenario in which a star tracker in accordance with embodiments of the present disclosure is used to determine an attitude of a platform.

FIG. 1 depicts a platform 104 carrying a star tracker 108 in accordance with embodiments of the present disclosure. As used herein, a platform 104 can include, but is not limited to, a satellite, a manned spacecraft, an interplanetary spacecraft, an interstellar spacecraft, an orbiter, a lander, an aircraft, a balloon, a stratospheric balloon, a ship or any other platform or device to which a star tracker 108 can be mounted or associated. The star tracker 108 images a scene 110 containing a plurality of stars 112 within a field of view 116 of the star tracker 108. The field of view 116 is associated with a line of sight or boresight 118. Although depicted with a single field of view 116, a star tracker 108 can have multiple fields of view 116. Alternatively or in addition, a platform 104 can be associated with a plurality of star trackers 108 having the same or different fields of view 116. In accordance with embodiments of the present disclosure, the star tracker 108 can reference a star catalog to determine the attitude of the star tracker 108 and the associated platform 104. Moreover, embodiments of the present disclosure provide a star tracker 108 with a trained vector based deep learning model that can determine the attitude of the star tracker 108 from a collected image of a scene 110 containing a plurality of stars 112. In accordance with still other embodiments of the present disclosure, a star tracker 108 is provided that can apply deep learning to determine the attitude of the star tracker 108 from a defocused image of a scene 110 containing a plurality of stars 112.

Figure 2:
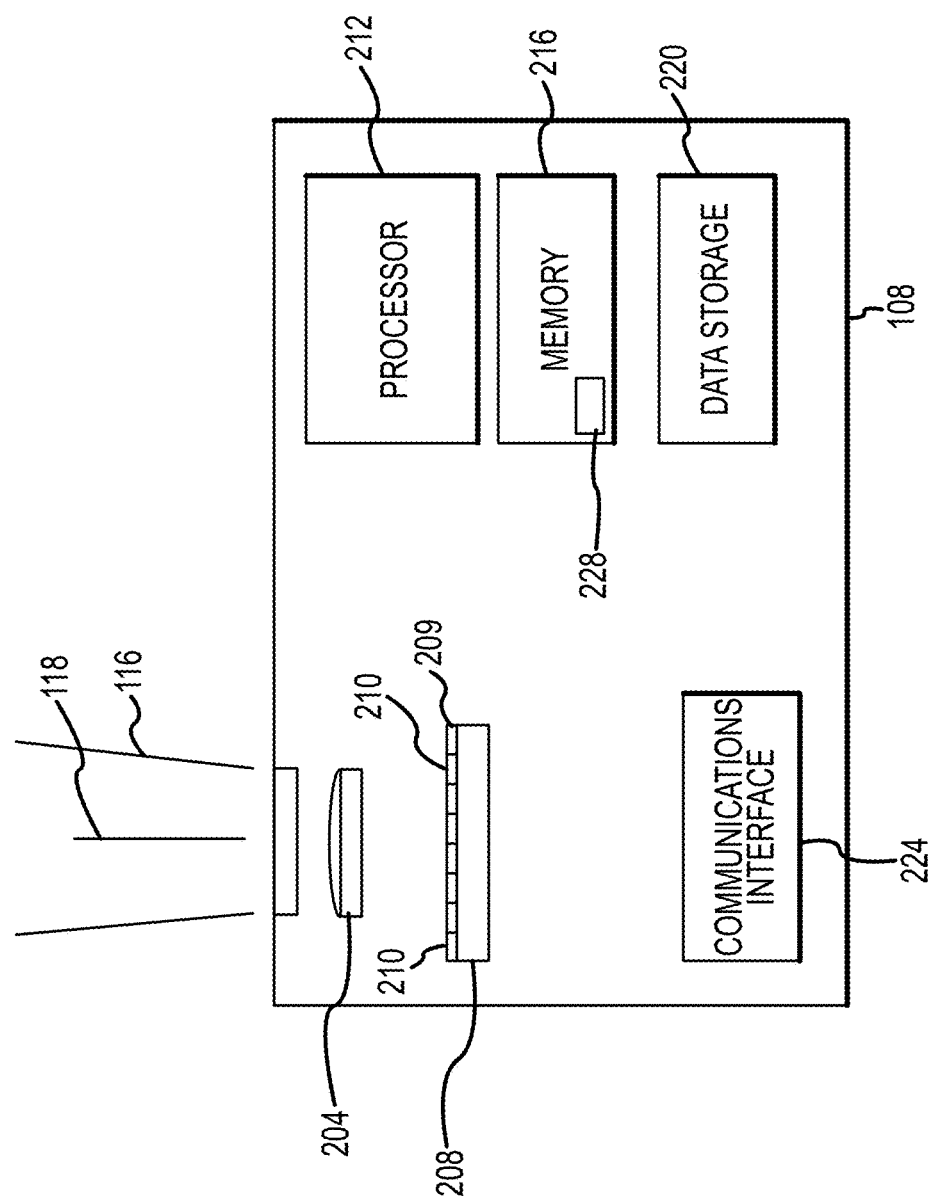
FIG. 2 depicts components of a star tracker in accordance with embodiments of the present disclosure.

FIG. 2 depicts components of a star tracker 108 in accordance with embodiments of the present disclosure. In general, the star tracker 108 includes a lens assembly or optical system 204 oriented to collect light along or within a field of view 116. The collected light is directed to a detector or sensor 208 having a focal plane array 209 defining an imaging plane incorporating a number of pixels 210 arranged in a two-dimensional array. As can be appreciated by one of skill in the art after consideration of the present disclosure, in addition to a focal plane array formed from a plurality of photosensitive sites or pixels 210, the detector 208 can incorporate or be associated with driver and analog to digital conversion (ADC) circuitry, enabling the detector 208 to provide a digital output representative of an amplitude or intensity of light detected at each pixel within the detector 208. As an example, but without limitation, the detector 208 can include a backside illuminated CMOS image sensor having a 1024×1024 array of pixels 210 and can operate at a frame rate of 10 Hz or more. In addition, the detector can feature a global shutter capability or function, enabling each pixel 210 to have the same absolute exposure period within a given frame of image data collected by the detector 208.

In accordance with embodiments of the present disclosure, the lens assembly or optical system 204 includes components that are available as commercial off the shelf (COTS) components, also referred to herein as catalog items. This is in contrast to standard moderate or high accuracy star trackers, which require expensive, custom-fabricated, multi-element optics. As a result, the optical system 204 components can be obtained at a lower cost than those incorporated into standard moderate or high accuracy star trackers. However, the quality of images obtained by the optical system 204 of at least some embodiments of a star tracker 108 as disclosed herein can be blurred or defocused, particularly as compared to standard moderate high accuracy star trackers. Alternatively or in addition, embodiments of the present disclosure can utilize an image sensor or detector 208 that is relatively low cost as compared to the image sensors typically incorporated in a moderate or high accuracy star tracker. For example, a star tracker 108 in accordance with embodiments of the present disclosure can utilize a CMOS image sensor 208 available as a relatively low cost, COTS image sensor. The use of such relatively low cost lens assembly 204 and detector 208 components can result in significant cost savings. The reduced performance of a low-cost lens assembly 204 and/or detector 208 are overcome by utilizing a neural network, which can incorporate vector-based deep learning (DL) and convolution methods, as described elsewhere herein.

The star tracker 108 additionally includes a processor 212, memory 216, data storage 220, and a communications interface 224. The processor 212 can include a general purpose programmable processor, graphics processing unit (GPU), a field programmable gate array (FPGA), controller, application specific integrated circuit (ASIC), or other processing device or set of devices capable of executing instructions for operation of the star tracker 108. The instructions executed by the processor 212 can be stored as application programming 228 in the memory 216 and/or data storage 220. As discussed in greater detail elsewhere herein, the application programming 228 is executed by the processor 212 to implement a neural network that identifies features, including stars, the centroids of stars, and/or intersections between overlapping image blurs of stars present in an image or in a defocused image. The neural network can incorporate vector-based DL and convolution processes. Moreover, as discussed in greater detail elsewhere herein, the processes implemented by the application programming 228 can incorporate a defocus module to intentionally create a blurred image. The memory 216 can include one or more volatile or nonvolatile solid-state memory devices, such as but not limited to RAM, SDRAM, or the like. The data storage 220 can include one or more mass storage devices, such as, but not limited to, a hard disk drive, optical storage device, solid-state drive, or the like. In addition to providing storage for the application programming 228, the memory 216 and/or the data storage 220 can store intermediate or final data products or other data or reference information, such as but not limited to a vector based deep learning model, navigational information, a star database or catalog, attitude and timing information, and image data. The communications interface 224 can provide determined attitude information to a local or remote output device, storage device, processing system, or the like. Moreover the communications interface can receive instructions, data, or other information from local or remote sources. As examples, the communications interface 224 can include a radio, optical communication system, serial interface, or the like.

Figure 3:
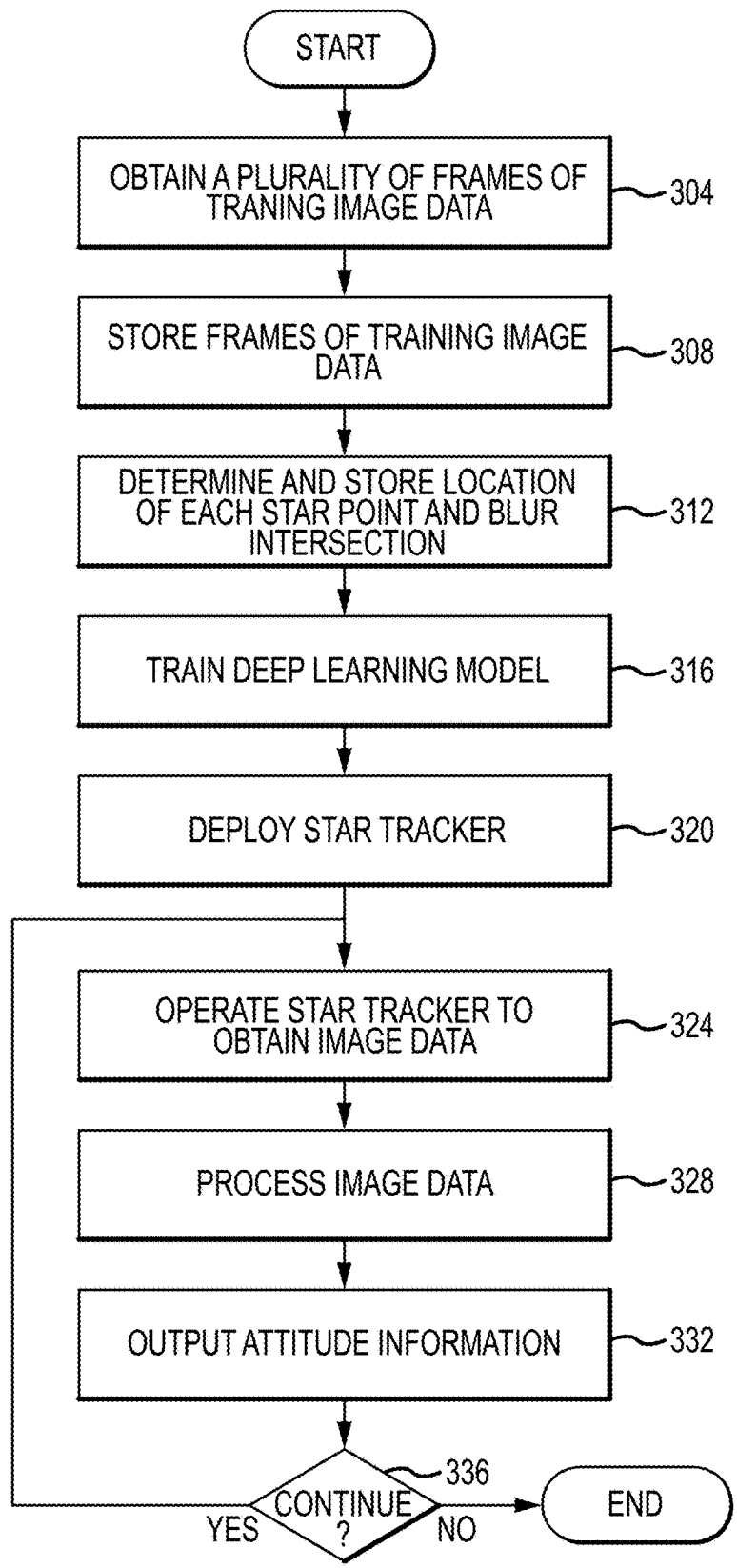
FIG. 3 is a flowchart depicting aspects of a method for determining an attitude of a platform in accordance with embodiments of the present disclosure.

FIG. 3 is a flowchart depicting aspects of a process or method for determining the attitude of a star tracker 108 in accordance with embodiments of the present disclosure. The method can be executed in connection with implementing or operating a star tracker 108 as described herein that is used to collect an image or images of a scene 110 containing a plurality of stars 112. Furthermore, the method can include defocusing a collected image or images of a scene 110 containing a plurality of stars 112. As discussed herein, the method can include processing the collected image data using one or more vector based deep learning networks implemented by the application programming 228 executed by the processor 212 of the star tracker 108. Accordingly, the method includes a process of training, and a process of application of the trained network to provide an attitude solution.

Initially, at step 304, multiple frames of training image data are obtained. Each frame contains a plurality of star points produced by stars 112 within a scene 110. Moreover, different training image data frames can include different sets of star points or images of different stars 112, and/or can be obtained from different perspectives or along different lines of sight 118. The different lines of sight 118 correspond to different attitudes of the camera or optical system used to obtain the images. The multiple training image data frames are then stored in memory 216 or data storage 220 (step 308). In accordance with embodiments of the present disclosure, the entirety of each frame of collected image data is used in implementing the training and attitude determination process. Accordingly, the entire frame of collected image data is stored. The image data can be obtained by the star tracker 108 being trained, by another star tracker, by another optical system, or can include simulated data.

Figure 4:
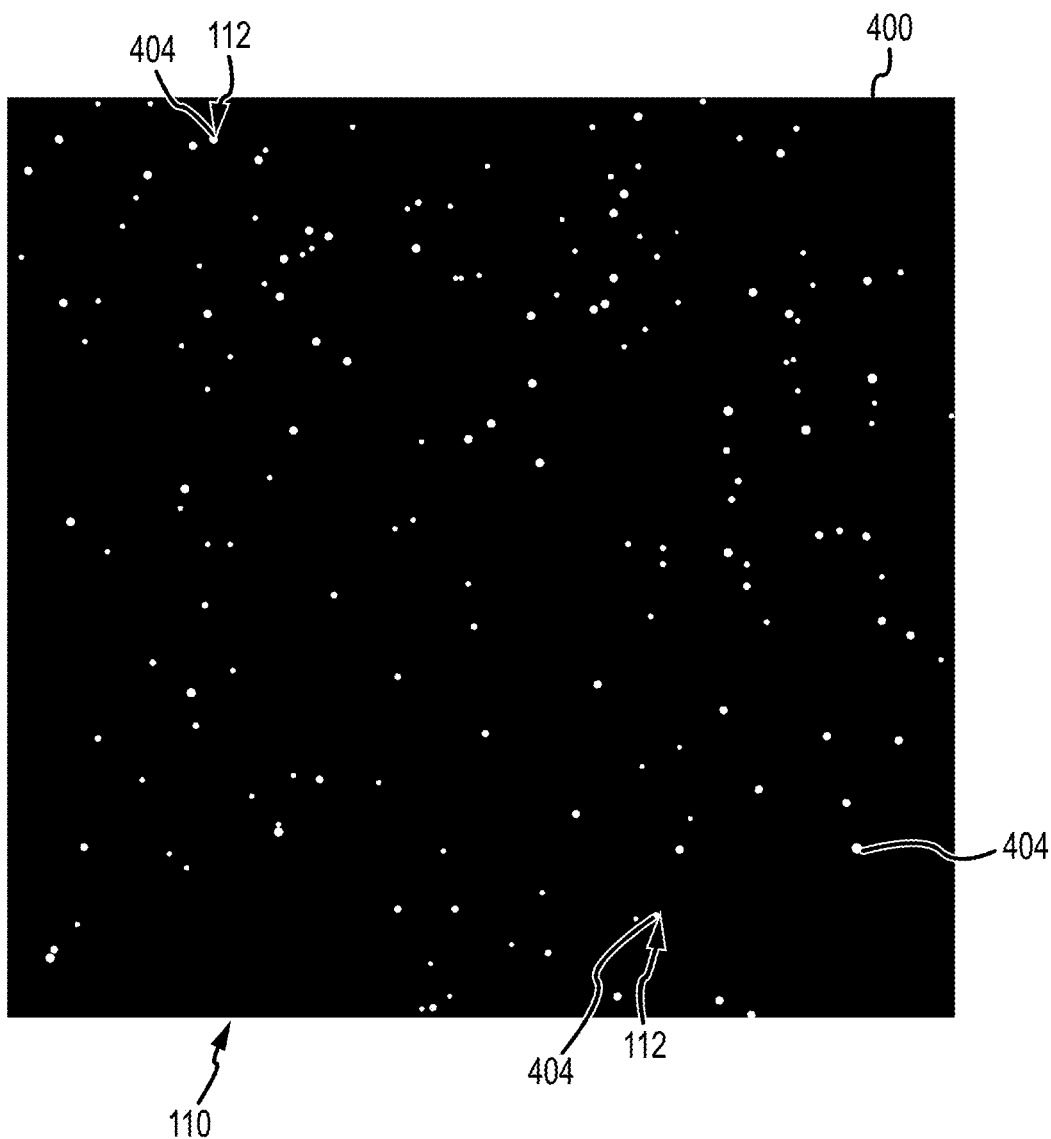
FIG. 4 depicts a field of stars imaged using precisely focused optics.

With reference now to FIG. 4, a simulated image 400 of a scene 110 encompassing a field of stars 112 obtained from within an 8 degree field of view 116 is depicted. The image 400 is an example of the type of image data that can be processed and stored as training data. The image 400 is depicted as one collected by a focused optical system 204, providing a relatively sharp image in which the stars 112 contained within the image 400 are shown as points or small areas 404 that each encompass a relatively small area of the detector 208 array 209. The simulated image 400 depicted in the figure could correspond to an image collected by the optical system 204 and detector 208 of a star tracker 108 in accordance with at least some embodiments of the present invention. In particular, although the image collected by a star tracker 108 in accordance with embodiments of the present disclosure may have a larger point spread function than a star tracker of moderate accuracy that utilizes relatively higher cost, higher quality optics, such as used in a standard medium or high accuracy star tracker system, embodiments of the present disclosure can be operated in connection with the acquisition of focused images. Alternatively, the imaged field of stars 112 could correspond to an image collected by a star tracker or other optical system having a smaller point spread function than a star tracker 108 in accordance of embodiments of the present disclosure, providing a relatively sharp image of the stars 112 contained within the image frame. Furthermore, this image is depicted as being obtained by a detector 208 with a relatively large number of pixels (e.g. 1024×1024). The example image includes 80 observable stars 112 in the stellar field. According to a typical approach, a relatively small number of the stars (e.g. 8) over the relatively small area of the detector (e.g. about 800 pixels in one portion of the image frame) are used to solve for the attitude of the star tracker. However, in accordance with embodiments of the present disclosure, the entirety, or at least most of, the image frame is used to solve for the attitude of the star tracker 108. Because the locations and/or relative locations of stars 112 within the image correlates to an attitude of the imaging system, the inclusion of additional points or features associated with stars 112 within the operative field of view can enable increased attitude determination accuracy.

Figure 5:
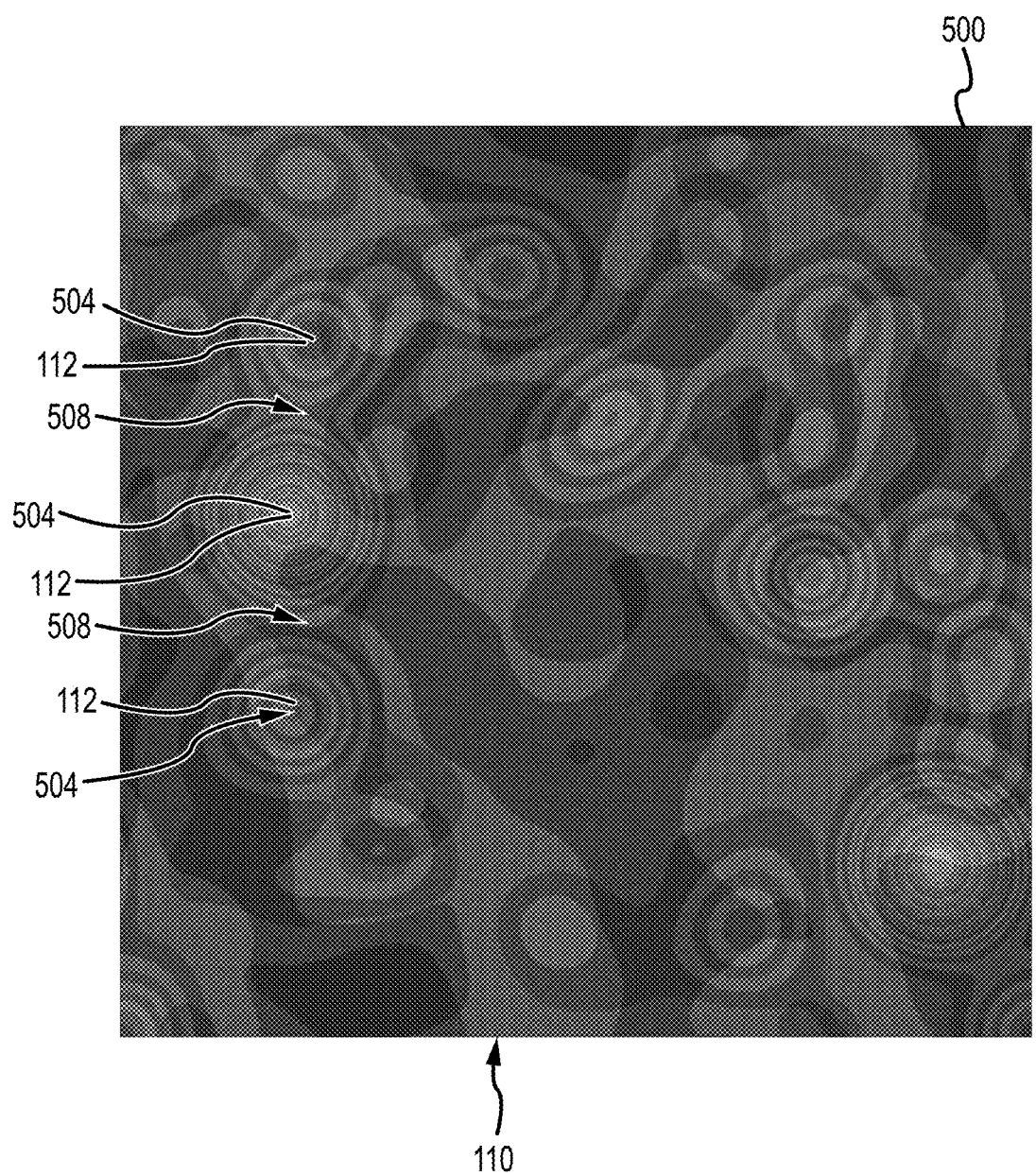
FIG. 5 depicts a field of stars imaged using defocused optics.

With reference now to FIG. 5, a simulated, defocused image 500 of a scene 110 encompassing a field of stars 112, such as may be obtained by a star tracker 108 in accordance with embodiments of the present disclosure, is depicted. As shown, individual stars 112 appear in the image data as blurs or annuli 504 of light surrounding the location of the star 112, with each blur 504 encompassing a relatively large area of the detector 208 focal plane array 209. The spreading of the light from the point sources (i.e. the stars 112) present within the image 500 creates features that can be used to determine the attitude of the star tracker 108, in addition to the centroid of the blur or annulus 504 resulting from individual stars 112. These additional image features can include points of intersection 508 between blurs 504 obtained from different stars within the field of view, and the contours of the blurs 504. The simulated image 500 depicted in the figure could correspond to an image collected by the optical system 204 and detector 208 of a star tracker 108 in accordance with embodiments of the present invention. In particular, the image collected by a star tracker 108 in accordance with embodiments of the present disclosure may have a larger point spread function than a star tracker of moderate accuracy utilizing relatively higher cost, higher quality optics, such as used in a standard medium or high accuracy star tracker system, resulting in defocused images. Accordingly, the image data 500 can be at least partially defocused or even heavily defocused as obtained by the lens assembly 204 and the detector 208. This can be due, at least in part, to the use of relatively inexpensive, catalog optical 204 and detector 208 components such as can be included in a star tracker 108 in accordance with embodiments of the present disclosure. Alternatively or in addition, the defocusing or blurring of an obtained image is produced intentionally. For example, a collected image can be defocused or blurred through operation of the focus setting of the lens assembly 204, a positioning of the detector 208 relative to the lens assembly 204, or the incorporation of diffusing or blurring elements within the lens assembly 204 or the optical train generally. Alternatively or in addition, the defocused image 500 of the field of stars 112 could correspond to an image collected by the optical system 204 and detector 208 of a star tracker 108 in accordance with embodiments of the present invention that has been defocused, entirely or by some additional amount, through the execution of a defocus kernel or function included in the application programming 228. As yet another alternative, the defocused image of the field of stars 112 could correspond to an image collected by a star tracker or other optical system having a smaller point spread function than a star tracker 108 in accordance of embodiments of the present disclosure, and that natively provides a relatively sharp image of the stars 112 within an imaged scene 110 that has been defocused through the execution of a defocus kernel or function included in the application programming 228. For instance, the application programming 228 can include a blurring kernel that effects a blurring of the image data as that data is processed. As can be appreciated by one of skill in the art, the blurring of image data through execution of application programming can be performed in addition to the blurring or defocusing of the image data by the lens assembly 204 and detector 208. In accordance with embodiments of the present disclosure, the entirety or at least most of the blurred image frame is used to determine the attitude of the star tracker 108. As can be appreciated by one of skill in the art after consideration of the present disclosure, the use of additional image features across a large frame incorporating a large number of pixels 210 enables increased accuracy of an attitude determination by providing additional information as compared to a device with a smaller number of pixels.

At step 312, the location of each star point or the centroid of a blur 504 associated with a star point within each of the blurred images 500 is determined and stored in memory 216. The location of each star point can be identified using a centroiding method. In addition, step 312 can include determining the location of each point of intersection 508 or overlap between every star point's blur 504 within the image. That information can also be stored in the memory 216.

At step 316, the stored location and spatial relationship information obtained from each of the full frame images 500, and the attitude or lines of sight 118 associated with each of the images 500, is used to train a vector-based deep learning model implemented by the application programming 228 to identify the visual features 504 and 508 that emerge as a result of heavily blurred stars within an image 500. Moreover, the location and spatial relationship information of the features 504 and 508 in different images 500 encompassing different fields of view 116 can be correlated to different star tracker 108 attitudes. More particularly, embodiments of the present disclosure provide for the training of a deep learning network for enabling the classification and localization of image features. The training can include capturing and processing a plurality of star tracker full-frame images that each contain a plurality of image features created by collecting light from stars 112 in the different fields of view 116 at different attitudes. The processed information can be incorporated into a model or star catalog that is then applied to determine attitude information from collected images as discussed elsewhere herein.

In accordance with embodiments of the present disclosure, the deep learning model can implement an HCN (see FIG. 6) that maintains vector information and that is trained to identify these features and to output the pixel-space coordinates of the features and a determined angle of orientation or attitude of the star tracker 108. As can be appreciated by one of skill in the art after consideration of the present disclosure, it is important to maintain relative spatial relationships between features 504 and 508 in an image 500 used by a star tracker 108 in connection with attitude determination; this is one of the attributes of an HCN. The full HCN can then be applied without optimization to a deployed star tracker 108. Alternatively, the model can be optimized by pruning to simplify the network. Pruning can be achieved by identifying parts of the trained model that are not activated after training is complete, and by identifying those parts of the trained network that do not contribute to the specific vector outputs of interests selected for a particular application. In general pruning of the HCN simplifies the number of operations for optimized runtime performance and concentrates the model on effectively identifying the features used to identify the stars 112 in the scene.

Figure 7:
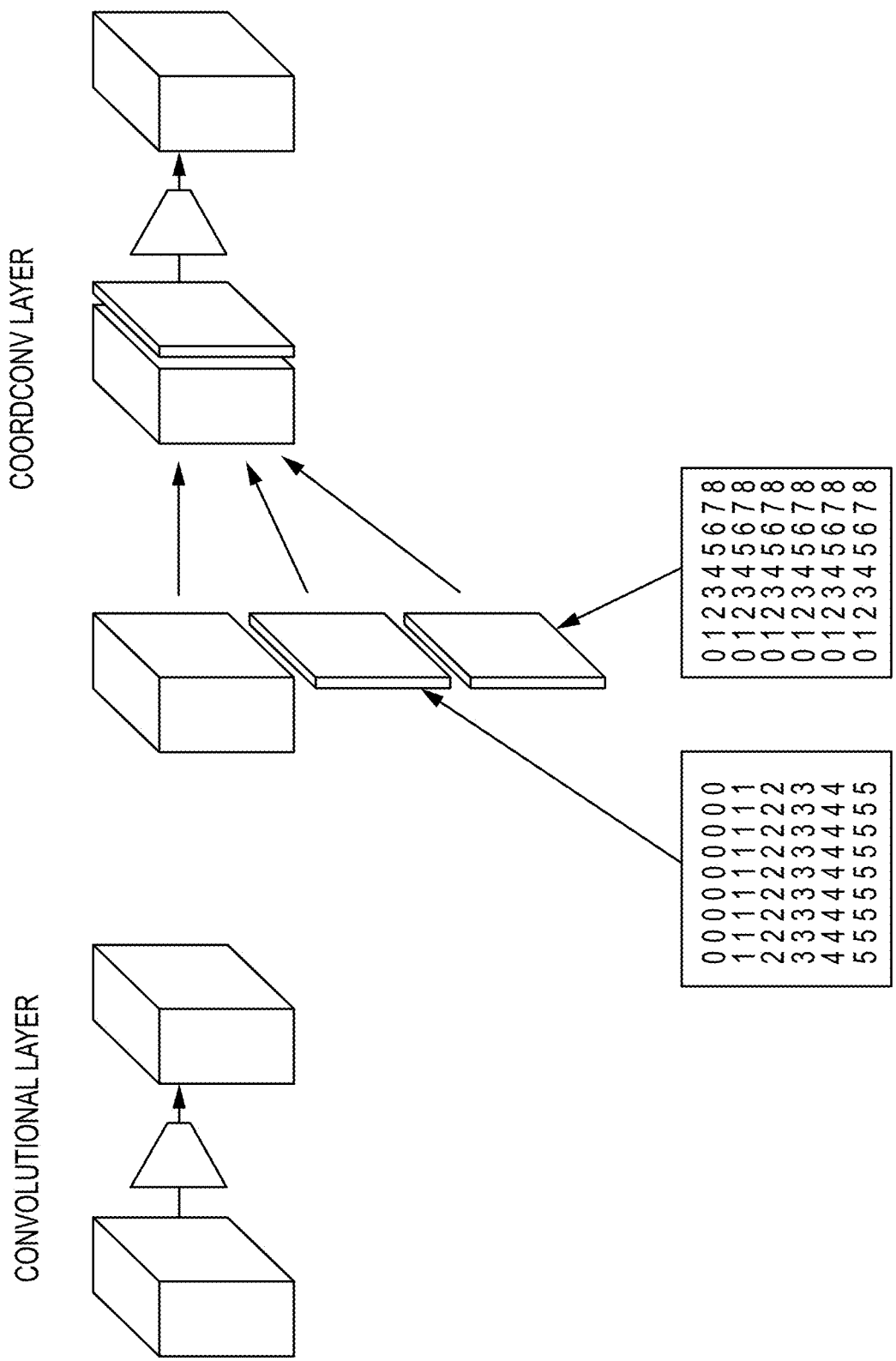
FIG. 7 depicts a coordinate convolution layer of a deep learning network.

In accordance with other embodiments of the present disclosure, a deep learning model features a network that incorporates a coordinate convolution layer (see FIG. 7). In particular, the coordinate convolution layer adds two channels of information, in the form of coordinates, that supply location information for each of the pixels to the standard convolutional neural network filters. This coordinate information in turn allows location information of features 504 and 508 in an image 500 to be maintained, without requiring that vector information be propagated through the entire network. Accordingly, a coordinate convolution layer can be included in a deep learning model implemented by the application programming 528 to provide attitude determination functions.

In applying either an HCN or a coordinate convolution layer, embodiments of the present disclosure avoid the use of a max pooling layer, which uses the maximum value clustered convolutional neural network nodes or averaging to reduce model complexity by assuming that different internal representations of an image don't change the properties of the image. The use of a max pooling layer is effective at reducing the complexity, and thus increasing the speed, of neural networks. However, convolutional neural networks that incorporate max pooling are prone to misclassifying output results. Accordingly, in applications that require certainty in the relationship between identified objects within an image, such as star tracker applications, max pooling is preferably avoided.

After training of the model implemented by the application programming 228, the star tracker 108 can be deployed (step 320). Deployment of the star tracker 108 can include placing a platform 104 carrying the star tracker 108 at a location or in an area in which operation of the star tracker 108 to determine the attitude and/or location of the star tracker 108 and the associated platform 104 is desired. The star tracker 108 can then be operated to obtain a frame of star tracker image data (step 324). The star tracker image data is defocused image data 500, and contains blurred images 504 of point sources or stars 112 having centroids and forming intersections 508. The blurring or defocusing of an image collected by the star tracker can be the result of the use of relatively low cost optical 204 and/or detector 208 components. Alternatively or in addition, the blurring or defocusing can be the result of the intentional blurring or defocusing of the image data. Intentional blurring or defocusing can be implemented in the hardware of the optical system 204 or the detector 208, or both. For instance, elements within the optical system 204 can be shifted relative to one another or relative to the detector 208, or the detector location can be shifted relative to the optical system 204, such that light collected by the optical system 204 is not focused at the focal plane 209 of the detector. As another example, a diffusion or blurring element can be incorporated into the optical system 204. Intentional blurring or defocusing can also be implemented in software. For example, the application programming 228 can include a blurring or defocus module that creates blurs 504 and intersections 508 between blurs in a processed version of a collected image, to form a blurred or defocused image 500. In addition, embodiments of the present disclosure collect and process image data that encompasses the entirety or at least most of the pixels 210 of a detector 208 having a large number (e.g. at least one million) of pixels.

The frame of blurred or defocused image 500 data is then processed to classify and localize features 504 and 508 within the data (step 328). In accordance with embodiments of the present disclosure, features that are classified and localized can include point sources, such as star 112 points within the image frame, or the centroid of a blurred image 504 of a star point. In addition, features that are classified and localized can include intersections 508 between blurred images 504 of individual stars 112 present in the image data as obtained by the detector 208, and/or as created in a blurring module or function implemented by the application programming 228. Thus, embodiments of the present disclosure enable features in addition to the relative locations of star points 112 to be utilized in determining the attitude or pose of the star tracker 108. In addition to creating and using features within an obtained image that supplement and are in addition to the location of point sources themselves, embodiments of the present disclosure utilize the image information obtained from across all or most of the detector 208. Accordingly, the number of features encompassed by the frame of image data that are used to determine the attitude of the star tracker 108 is increased as compared to standard star tracker implementations. This in turn enables a star tracker 108 in accordance with embodiments of the present disclosure to provide attitude determinations with an attitude uncertainty that compares to the attitude uncertainty of a star tracker using higher cost components.

Figure 6:
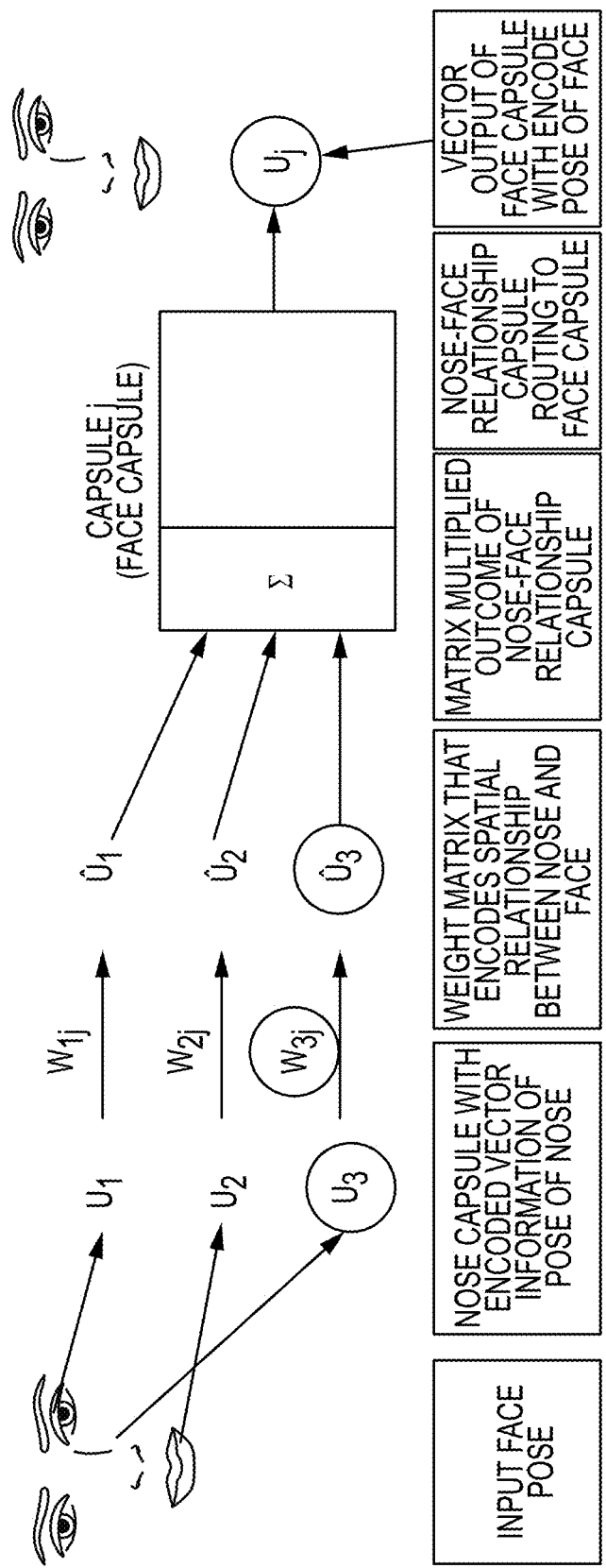
FIG. 6 depicts a Hinton's capsule network.

In accordance with embodiments of the present disclosure, vector-based convolution based deep learning techniques are applied to the defocused field to provide attitude determination performance that is equivalent to standard moderate and high accuracy star trackers, even using relatively low cost, low-grade, low precision optical system 204 components, and even using relatively low cost, low-grade, high noise detector 208 components. In particular, embodiments of the present disclosure use the trained capsule network (HCNs) to simultaneously classify and localize features that emerge from a defocused scene of stars 112. HCN is a method of DL which incorporates vector-based information (specifically all pose information) of objects to capture spatial relationships. Pose includes position (x, y, z) and orientation, instantiated in a "Capsule" which encapsulates vector information about the state of the feature being processed through the HCN (FIG. 6). Other embodiments use a neural network featuring a coordinate convolution layer (FIG. 7) that provides coordinate information for each pixel to the filters of the network to classify and localize features of the imaged scene. Because of the additional features created by the blurring of each light source, a star tracker 108 accordance with embodiments of the present disclosure, including embodiments incorporating an HCN or a coordinate convolution layer, can generate a suitable attitude solution in the presence of noise and distortion created by the optics 204 and/or detector 208. As can be appreciated by one of skill in the art after consideration of the present disclosure, the features that have been classified and localized can be applied to a star catalog stored in data storage 220 to determine the attitude of the star tracker 108.

The determined attitude solution can then be provided as an output (step 332). The output can be provided to a navigational module included in the platform 104, to an external vehicle or center, and/or stored for later use. Moreover, the output can include the attitude of the star tracker 108, and/or the location of the star tracker 108 within a reference frame.

At step 336, a determination can be made as to whether the process of obtaining image data and calculating an attitude solution should continue. If the process is to be continued, it can return to step 324, to obtain a new frame of image data. Alternatively, the process can end.

Standard moderate accuracy star trackers (i.e., attitude uncertainty ~1 arc-second) require expensive low noise detectors and custom-fabricated multi-element optics. The conventional approach is an expensive attitude determination instrument solution that only tracks tens of stars (within hundreds of pixels) on the focal plane, due to the nature of CCD readout and limitations in computational power. Embodiments of the present disclosure utilize commercial off-the-shelf (COTS) detectors (order tens of dollars) and off-the-shelf low-cost optics (order hundreds of dollars). The compromise in detector and optical performance allows a cost reduction factor in the 100's.

To maintain attitude uncertainty in the realm of 1 arc-second, embodiments of the present disclosure increase the available information from tens of stars (within hundreds of pixels) on the focal plane to the hundreds of stars across the entire focal plane (utilizing ~1 million pixels). In addition, the blurring and creation of additional image features that can occur as a result of the use of COTS optical system 204 and detector 208 components is used to advantage in making attitude determinations. Commercially available, low cost CMOS detectors readily provide full-frame output (millions of pixels) at frame rates upwards of 10 Hz, thus enabling this approach. To make use of the additional data, a processing strategy is employed that combines image processing and vector-based deep learning (DL) to extract information from the full-frame images. The added information from the larger field of view more than compensates for the lesser performance of the low-cost detector/optic combination.

Embodiments of the present disclosure utilize very low-cost COTS detectors and optics provide overall cost reduction factor in the 100's while achieving similar performance compared to standard medium accuracy star trackers. The lesser performance of the low-cost detectors and optics are overcome by utilizing vector-based DL and convolution methods to process features across the full image frame (all available pixels) instead of only a portion of the image (hundreds of pixels) as in the heritage approaches.

Heritage approaches use precise optics, localizing starlight to few pixels, from which precise attitude information can be derived. In contrast, embodiments of the present disclosure take advantage of image blur and make use of point spread function (PSF) overlap. Information from a scene is extracted from pixel-to-pixel relationships and associated information. Heavy defocus in the optical train or convolution with a blurring kernel in processing can yield such intra-pixel information spread, where defocused stars produce annuli that interplay with other annuli thus increasing the number of pixels that contain useful information. The result obtained using a star tracker 108 in accordance with embodiments of the present disclosure is comparable to the performance of heritage approaches, but without the need for precision optics.

Embodiments of the present disclosure use vector-based deep learning to process the full-frame star field images. Combined with the additional intra-pixel information provided by the defocus method outlined above, this results in high precision attitude determination. In addition to enabling the use of low cost optics 204 and detectors 208, embodiments of the present disclosure can provide accurate attitude determinations even after the alignment of optical system 204, detector 208 or other star tracker 108 components has been altered due to stresses during the launch or repositioning of a platform 104 carrying the star tracker 108, due to damage or wear after the star tracker 108 has been operationally deployed, or due to any other causes.

A method for very low-cost star trackers built with low-cost, commercially available detectors and optics, while still providing attitude uncertainties comparable with conventional moderate accuracy star trackers (~1 arc-second), is provided. The method uses full-frame images instead of partial-frame as in conventional methods, enabled by CMOS imagers in place of the traditional CCD. In addition, the method uses heavy defocus to spread useful information from a stellar field over additional pixels, lending to supplementary data apart from star locations. Vector-based deep learning methods such as HCN, or an approach that incorporates a coordinate convolution layer, can be used to solve for attitude based on the described approach.

Embodiments of the present disclosure provide a method of increasing the accuracy of star trackers using a plurality blurred stars formed in the full-frames of the star tracker and vector-based deep learning comprising:

(a) Capturing a plurality of star tracker full-frames, each frame containing a plurality of star points in the star tracker's field of view, (b) Storing the plurality of tracker full-frames in memory, (c) Blurring the star points in each image frame to widen the point spread function of each star point so that the blurred star points intersect or overlap and create additional data points at these intersections or overlaps (data useful for attitude determination). Blurring can be achieved by defocusing in optics or performing a convolution in image processing.

(d) Using a centroiding method to determine and store in memory the location of each star point that is blurred and the location of every star point's blur intersection or overlap in each full-frame.

(e) Establishing and recording in memory the spatial relationships between each star point that is blurred and the spatial relationships between every star point's blur intersection or overlap in each full-frame.

(f) Using the stored location and spatial relationships in each full-frame determined is steps (a) through (e) to train a vector-based deep learning model such as a HCN to identify the visual features that emerge as a result of heavily blurred stars. Using an HCN trained to identify these features will output the pixel-space coordinates and angle of orientation. Each of these additional bits of information in conjunction with the overall increase in quantity of features identified in a scene increases the accuracy of the solution.

(g) Using the full HCN without optimization or optimizing the model by pruning. Methods of pruning to simplify the network include: (a) removing the parts of the trained model that are not activated after it's trained and (b) removing those parts that do not contribute to the specific vector outputs of interest selected for a particular application. Pruning of the HCN simplifies the number of operations for optimized runtime performance and concentrates the model on effectively identifying the features used to identify the stars in the scene.

(h) Deploying the full HCN or a pruned model in the field and using actual full frame data (e.g., from an operational flight using a star tracker) to measure and provide high-accuracy star tracking.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising: obtaining a plurality of frames of training image data, wherein each frame of training image data is associated with an attitude and contains image information associated with a plurality of stars, wherein at least some of the frames of training image data include blurred image data, and wherein the blurred image data includes blurs corresponding to at least some of the stars in the plurality of stars;
for each of the frames of training image data, including the frames including blurred image data, storing information related to relative locations of image features in the frame of training image data, wherein the image features include centroids of the blurs corresponding to the at least some of the stars and points of intersection between different blurs corresponding to the at least some of the stars;
training a vector based deep learning model using the information related to relative locations of the image features in the frames of training image data, including the frames including blurred image data, to associate different relative locations of image features in the frames of training image data with different attitudes;
operating a star tracker to obtain a frame of star tracker image data, wherein the star tracker image data is blurred;
processing the frame of blurred star tracker image data using the trained vector based deep learning model to determine a relative location of each of a plurality of image features present in the frame of blurred star tracker image data; and
applying the determined relative location of at least some of the plurality of image features present in the frame of blurred star tracker image data to determine an attitude of the star tracker, wherein the image features applied to determining the attitude of the star tracker include centroids of the blurs corresponding to at least some of the stars, and points of intersection between different blurs corresponding to the at least some of the stars.

2. The method of claim 1, wherein the star tracker image data is blurred at an imaging plane of a detector of the star tracker.

3. The method of claim 2, wherein the star tracker image data is blurred by a defocus module implemented by the star tracker.

4. The method of claim 1, wherein the star tracker image data is blurred by a defocus module implemented by the star tracker.

5. The method of claim 1, wherein the training image data is defocused.

6. The method of claim 1, wherein the vector based deep learning model includes a Hinton's capsule network.

7. The method of claim 1, wherein the vector based deep learning model includes a coordinate convolution layer.

8. The method of claim 1, wherein the star tracker image data includes blurs associated with at least one hundred stars.

9. The method of claim 8, wherein the star tracker image data is obtained using a detector having thousands of pixels.

10. The method of claim 1, wherein the star tracker is carried by a platform, and wherein the star tracker image data is obtained while the platform is deployed in space.

11. The method of claim 1, further comprising storing information related to an attitude associated with each of the frames of training image data.

* * * * *